Aug. 31, 1943.    R. W. WENGEL    2,328,239
PROJECTOR SHUTTER
Filed July 25, 1940    2 Sheets-Sheet 1

SHUTTER BLADE MOVEMENT

RAYMOND W. WENGEL
INVENTOR

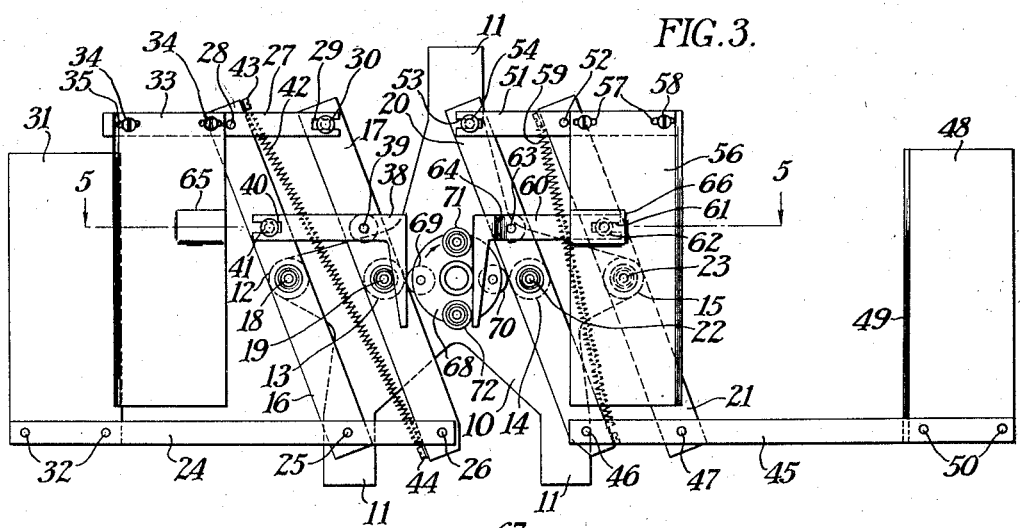
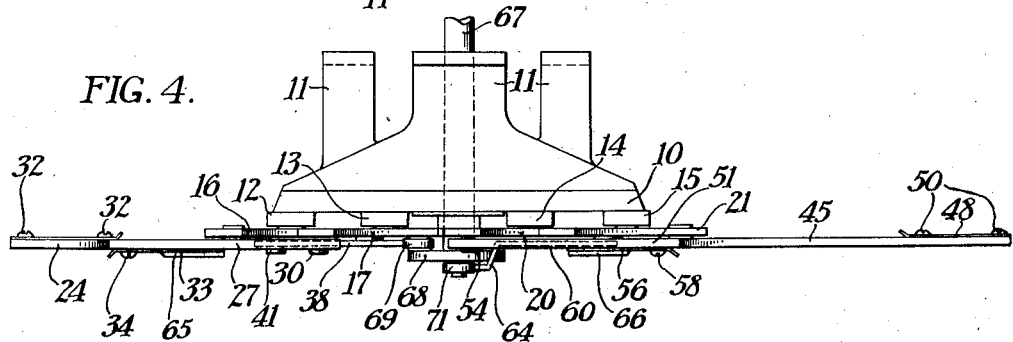
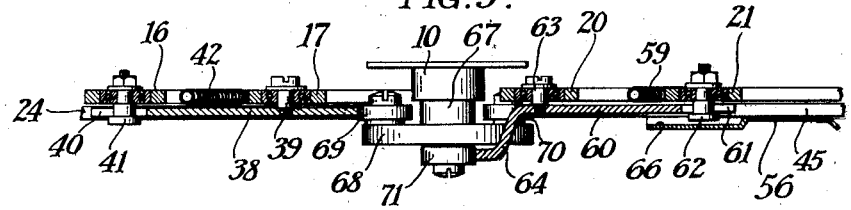

Patented Aug. 31, 1943

2,328,239

UNITED STATES PATENT OFFICE 2,328,239

PROJECTOR SHUTTER

Raymond W. Wengel, Rochester, N. Y., assignor to Eastman Kodak Company, Rochester, N. Y., a corporation of New Jersey Application July 25, 1940, Serial No. 347,442

10 Claims. (Cl. 88—16.6)

The present invention relates to improvements in projector shutters and more particularly to cross-dissolving shutters for duplex projectors which are illuminating the same area.

It is difficult to cross-dissolve from one projected image into another and at the same time maintain a constant screen brightness and uniform distribution of illumination over the entire screen. Due to the characteristics of the light beam from a condenser, especially in extremely high wattage projectors, it has been found that known forms of cross-dissolving shutters vary the screen brightness and distribution of illumination during the dissolve.

The primary object of the present invention is the provision of cross-dissolving shutters for a duplex projection apparatus having a pair of illuminating and optical assemblies of similar characteristics for projecting a light beam onto the same area and which are operated to close one shutter assembly and open the other at such relative rates that the total brightness and uniformity of illumination on the screen are substantially constant.

Another object of the invention is the provision of a pair of cross-dissolving shutter assemblies for a duplex projector having a pair of illuminating and optical assemblies for projecting a light beam onto the same area and in which the shutter assemblies are moved with simple harmonic motion in quadrature to close one and open the other so that the total brightness and uniformity of the illuminating area remain constant.

A further object of the invention is the provision of a pair of shutter assemblies each having a pair of shutter blades movable in opposite directions with respect to the axis of a pair of illuminating and optical assemblies projecting a light beam onto the same area and a driving means operated by a revolving part on a rotating disk to impart simple harmonic motion to each of the shutter blades and to open one shutter assembly and close the other so that uniform and constant illumination are projected onto the area or screen.

Other and further objects of the invention will be suggested to those skilled in the art by the description which follows.

The above and other objects of the invention are embodied in a duplex projection apparatus having a pair of gate stations and including in combination a pair of similar illuminating and optical assemblies for projecting the light beam onto the same area, a pair of shutter assemblies movable to open and closed positions, and a driving means operatively connected to said assemblies and moving the blades thereof with simple harmonic motion so that the total brightness and uniformity of illumination on the screen are substantially constant during the complete dissolve.

Reference is hereby made to the accompanying drawings wherein similar reference characters designate similar elements and wherein:

Fig. 3 is an elevation of the cross-dissolving shutter assemblies made according to the invention.

Fig. 4 is a plan view of the cross-dissolving shutter assemblies as shown in Fig. 3, and Fig. 5 is a fragmentary horizontal section through the driving means for said shutter assemblies taken on the line 5—5 of Fig. 3.

While the cross-dissolving shutter assemblies and driving means therefor will be disclosed and described as used upon a duplex projector, it should be understood that such shutter assemblies may be used to equal advantage under other circumstances where uniform and constant screen brightness during dissolving are essential.

Figure 1:
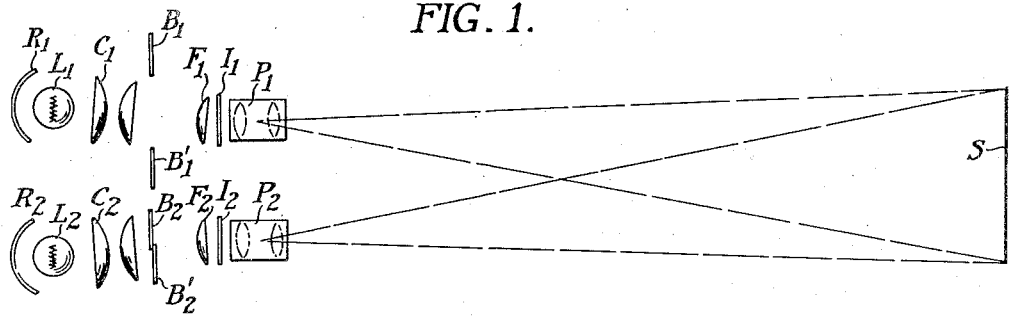
Fig. 1 is a diagrammatic view of a duplex projection apparatus having a pair of illuminating and optical assemblies for projecting the light beam onto the same area or screen.

Fig. 1 illustrates a duplex projection apparatus comprising a pair of illuminating and optical assemblies of similar characteristics for projecting a light beam onto the same area or screen through image elements and including two pairs of shutter blades which may be moved to cross-dissolve the image from one projector into the image from the other projector. A light source $L_1$ and associated reflector $R_1$ direct light through a condenser system $C_1$. Shutter blades $B_1$ and $B'_1$ are mounted forward of the condenser system which through the field lens $F_1$ forms an image of the light source $L_1$ at the gate station in which the image element $I_1$ is supported and the projection lens $P_1$ projects a light beam or image from the image element $I_1$ onto the screen S. A similar illuminating and optical assembly comprises a light source $L_2$ and reflector $R_2$ directing light through a condenser $C_2$, and shutter blades $B_2$ and $B'_2$ in closed position in front of the condenser $C_2$ interrupt the light beam. However, said condenser $C_2$ through a field lens $F_2$ forms an image of the light source $L_2$ at the gate in which image element L₂ is mounted and projection lens P₂ projects an image onto the screen S when the shutter blades B₂ and B'₂ are opened.

Figure 2:
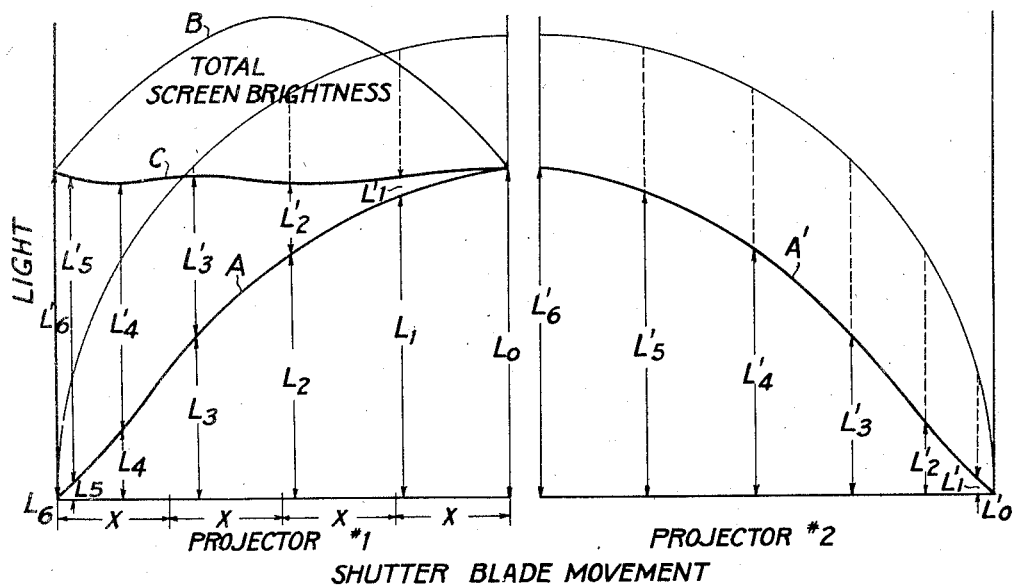
Fig. 2 is a graphic illustration of the screen illumination under certain conditions.

If the shutter blades B₁ and B'₁ are each moved the increments $x$ toward each other to a closed position it will be found that the screen brightness on account of projector #1 will decrease as indicated by the curve A of Fig. 2. In the same manner as shutter blades B₂ and B'₂ are moved to open position by equal increments, the screen brightness on account of projector #2 will increase as indicated by the curve A' of Fig. 2. If the two pairs of shutter blades B₁ and B'₁, B₂ and B'₂ are moved in opposite directions by the same increments, the total screen brightness is represented by the addition of the screen brightnesses for each position and the total screen brightness during the complete dissolve is represented by the curve B. It will be noted that under these conditions the screen brightness increases about 50% at the middle of the dissolve to give a very unpleasant and undesirable effect.

As before mentioned, the primary object of this invention is to maintain a substantially constant screen brightness during the dissolve by moving the shutter blades respectively to close one shutter assembly and open the other at such rates that a practically constant screen brightness and uniform illumination are obtained. Movement of the shutter blades of the respective shutter assembly with simple harmonic motion in quadrature is a simple and effective way of accomplishing this result which is also graphically illustrated in Fig. 2.

By dividing the quadrant having a radius of the shutter blade movement into equal segments and projecting the points so determined onto the curves A and A', the screen brightnesses at the various positions of the shutter blades are obtained. For instance, the screen brightness with shutter blades B₁ and B'₁ open is represented by the ordinate L₀. This is the position of the shutter blades illustrated in Fig. 1 and since the shutter blades B₂ and B'₂ are closed the corresponding illumination on account of projector #2 will be zero as represented by the point L'₀. The simple harmonic motion for closing shutter blades B₁ and B'₁ will reduce the screen brightness from projector #1 to the value illustrated by the ordinate L₁, while the simple harmonic movement in quadrature of shutter blades B₂ and B'₂ will open those blades so that the screen brightness on account of projector #2 is represented by the ordinate L'₁ and the total screen brightness is represented by their sum. In the same manner as the blades B₁ and B'₁ are closed the screen brightness from projector #1 will decrease as represented by the ordinates L₂, L₃, L₄, and L₅ until the shutters are closed and L₆ or zero screen brightness is the result. Correspondingly, the shutter blades B₂ and B'₂ are being opened and the screen brightness due to projector #2 is increasing as represented by the ordinates L'₂, L'₃, L'₄, L'₅ and L'₆. By graphic addition of these corresponding ordinates, it is found that the total screen brightness existing during the entire dissolve is represented by the curve C which still indicates a slight variation of screen brightness but which is only a matter of a few percent so that the screen brightness may be considered as being substantially constant.

At the same time it appears that by keeping the total screen brightness practically the same during the entire dissolve, the uniformity of illumination throughout the screen is also maintained very uniform. Hence, it is established both by graphic illustrations and actual tests that the shutter blades during a cross dissolve may be moved at such relative rates that the uniformity of illumination and total screen brightness are substantially constant.

One arrangement of a pair of cross-dissolving shutter assemblies will now be described in connection with Figs. 3, 4 and 5. A spider-like support 10 has perpendicularly extending mounting arms 11 and has a series of embossings 12, 13, 14 and 15 on the other side thereof.

A pair of arms 16 and 17 are intermediately pivoted, respectively, to embossings 12 and 13 by pivots 18 and 19. Likewise, a pair of arms 20 and 21 are centrally pivoted respectively to embossings 14 and 15 by pivots 22 and 23. A shutter bar 24 is pivoted at one end to the ends of arms 16 and 17 by pins 25 and 26. A shutter bar 27 is pivoted to the other end of arm 16 by a pin 28 and has one end provided with a slot 29 riding on a headed stud 30 on the other end of arm 17. It will be noted that the arms 16 and 17 and the shutter bars 24 and 27 form a parallelogram linkage, the sliding connection between slot 29 and headed stud 30 being provided merely to prevent binding of such linkage. The shutter blade 31 is mounted on shutter bar 24 by a pair of bolts 32 and a shutter blade 33 is mounted on shutter bar 27 by means of a pair of bolts 34.

In practice, the shutter blades 31 and 33 are provided with horizontal elongated slots 35 through which the bolts 34 and 32 extend. As a result of this manner of mounting, the shutter blades 31 and 33 may be adjusted on the respective shutter bars 24 and 27 so that in closed position their edges will coincide precisely, however, it is preferable that, in closed position, the shutter blades 31 and 33 shall overlap so as to prevent any light leakage through the juncture of the shutter blades on account of any mechanical inaccuracies therein or in the mechanism mounting or moving the same.

A follower member is connected to the shutter blades and may in practice comprise an L-shaped lever 38 pivoted to the arm 17 by a pivot 39 and provided at its other end with a slot 40 slidably engaging a headed stud 41 on the arm 16. A resilient member such as a coil spring 42 is diagonally connected across the parallelogram linkage normally to move the same and said shutter blades 31 and 33 into open position. Specifically, one end of coil spring 42 is attached to the upper end of arm 16 by a screw 43 and its other end is connected to the lower end of arm 17 by a screw 44.

The other shutter assembly is preferably identical in construction and comprises a shutter bar 45 pivoted to the lower ends of arms 20 and 21, respectively, by pins 46 and 47. A shutter blade 48 has a beveled edge 49 and is attached to shutter bar 45 by a pair of bolts 50. A shutter bar 51 is pivotally connected to the upper end of arm 21 by a pivot 52 and is provided in one end with a slot 53 engaging a headed stud 54 on the upper end of arm 20. The shutter blade 56 is provided with elongated openings 57 through which bolts 58 extend for adjustable attachment of said blade 56 to the shutter bar 51. A coil spring 59 is diagonally connected between the upper end of arm 21 and the lower end of arm 20 normally to urge the shutter blades 48 and 56 into open position.

An L-shaped lever 60 is provided at one end with a slot 61 engaging a headed stud 62 on arm 21, is pivotally connected to arm 20 by a pivot 63 and has an offset portion 64, see Figs. 4 and 5. In order to avoid interference between the innermost shutter blades of each pair and the follower members, the shutter blade 33 is provided with an embossed portion 65 and the shutter blade 56 is provided with an embossed portion 66.

The driving means for oppositely moving the respective blades of each shutter assembly at rates to provide substantially constant screen brightness and uniformity of illumination is preferably of the type to give simple harmonic motions to each of the blades and such that the motions given one pair of blades are in quadrature with the motions given to the other pair of blades. Such a driving means comprises a shaft 67 journaled in the spider-like support 10 and carrying a disk 68. Two pairs of rollers are mounted on opposite sides of the disk 68, one pair of rollers 69 and 70 being revolubly mounted on the inner side of said disk 68 and the other pair of rollers 71 and 72 being revolubly mounted on the other or outer side of disk 68 and in the same plane with the offset end of the L-shaped lever 60.

By means of the construction disclosed and described, the blades of one shutter assembly are moved with simple harmonic motion to open the same and the blades of the other shutter assembly are closed by simple harmonic movement. Assuming that the shutter assemblies are in the positions shown in Fig. 3 with shutter blades 31 and 33 closed and shutter blades 48 and 56 open, rotation of shaft 67 will cause rotation of disk 68 in the direction of the arrow on Fig. 3. Such rotation will move roller 69 so that coil spring 42 may act to swing the parallelogram linkage including arms 16 and 17 to open blades 31 and 33 and the L-shaped lever 38 will be moved to follow the roller 69 until rollers 69 and 70 both engage the L-shaped lever 38 in the full open position of the blades 31 and 33. At the same time the roller 71 by its engagement with the end of L-shaped lever 60 will move arms 20 and 21 against the action of coil spring 59 and shutter blades 48 and 56 will be moved toward each other until they are closed.

As the rotation of shaft 67 continues, the roller 70 moves the L-shaped lever or follower 38 to move the arms 16 and 17 against the action of coil spring 42 and to close the shutter blades 31 and 33. Simultaneously, the roller 71 permits the coil spring 59 to move the follower 60 and arms 20 and 21 to open the shutter blades 48 and 55.

It will be noted that such closing and opening movements of the shutter assemblies are effected in 90° rotation of the shaft 67 or of disk 68. Furthermore, since the rollers 69 and 70, 71 and 72 bear against the straight faces of the respective L-shaped levers 38 and 60, these levers and the respective arms 16 and 17 and shutter blades 31 and 33 and arms 20 and 21 and shutter blades 48 and 56 will be moved with simple harmonic motion. Also, on account of the 90° displacement of the rollers 69 and 70 with respect to the rollers 71 and 72, these simple harmonic motions of the shutter blades will be in quadrature or displaced 90° with respect to each other.

The aforementioned overlapping of the shutter blades 31, 33 and 48, 56 may be adjusted according to the precision with which the edges of the blades meet. The extra movement necessary to take care of such overlap may be obtained by increasing the eccentricity or diameter of rollers 69—72 but at most is only a few degrees and will merely result in the extreme edges of the condenser system not being uncovered. In any event, the shutter assemblies and driving means therefor herein disclosed substantially fulfill the conditions of operation graphically represented to produce the total screen brightness curve C of Fig. 2. However, it is to be understood that the shutter movement may be altered or modified to obtain the same results without departing from the scope of the invention. Since many variations of the shutter assemblies and their driving means can be devised, the present disclosure is to be construed as illustrative and is not to be considered in a limiting sense.

Having now particularly described by invention what I desire to secure by Letters Patent of the United States and what I claim is:

1. In a duplex projection apparatus, the combination with a pair of illuminating and optical assemblies each including a light condenser lens and a projection lens and each for projecting a light beam onto the same area, of a pair of shutter assemblies respectively positioned between said condenser lens and said projection lens and each including a pair of shutter blades oppositely movable to open and closed positions with the juncture of said blades centrally of the respective light beam, and simple harmonic motion driving means moving the blades of one shutter assembly toward each other each with simple harmonic motion to close them, and simultaneously moving the blades of the other shutter assembly away from each other each with simple harmonic motion in quadrature to the movement of the blades of said one shutter assembly and to open said blades of said other shutter assembly.

2. In a duplex projection apparatus having a pair of gate stations, the combination with a pair of illuminating and optical assemblies of similar characteristics, each having an axis extending through one of said gate stations, and each for projecting a light beam onto the same area, of a pair of parallelogram linkages, a pair of shutter blades each mounted on opposite members of each of said linkages and each oppositely movable toward and away from said axis, respectively, to closed and open positions, a follower member connected to each of said linkages, and a rotatable disk carrying rollers angularly displaced at 90 degrees and each for respectively engaging one of said follower members to impart a simple harmonic motion to each of said shutter blades.

3. In a duplex projection apparatus having a pair of gate stations, the combination with a pair of illuminating and optical assemblies of similar characteristics, each having an axis extending through one of said gate stations, and each for projecting a light beam onto the same area, of two pairs of shutter blades, mounting means supporting said shutter blades in pairs in alignment with the respective illuminating and optical assemblies and for oppositely moving the shutter blades of each pair toward and away from said axis respectively to close and open the same, a pair of follower members connected to said mounting means and for respectively opening and closing said pairs of shutter blades, and a driving member engaging and moving both of said followers to move each blade with simple harmonic motion, and opening one pair of shutter blades while the other pair of shutter blades is being closed.

4. In a duplex projection apparatus having a pair of gate stations, the combination with a pair of illuminating and optical assemblies of similar characteristics, each having an axis extending through one of said gate stations, and each for projecting a light beam onto the same area, of two pairs of shutter blades, mounting means for supporting said shutter blades in pairs in alignment with the respective illuminating and optical assemblies and for oppositely moving the shutter blades of each pair toward and away from said axis respectively to close and open said shutter blades, adjustable connections between said shutter blades and said mounting means for varying the relative positions of said blades with respect to each other, a pair of follower members connected to said mounting means and for respectively opening and closing said pairs of shutter blades, and a driving member engaging and moving both of said followers to move each blade with simple harmonic motion, and opening one pair of shutter blades while the other pair of shutter blades is being closed.

5. In a shutter device for a duplex projection apparatus, the combination with a support, two pairs of arms intermediately pivoted to said support and two pairs of shutter bars pivoted to opposite ends of respective pairs of said arms to form two parallelogram linkages, and two pairs of shutter blades, each blade being attached to one of said bars, and the blades of a pair being movable away from each other to an open position and into overlapping relation to a closed position, of a pair of followers each being attached to respective pairs of said arms for movement parallel to said shutter bars, a rotatable member journaled in said support, a pair of rollers mounted diametrically opposite each other on one side of said member and for engaging one of said followers, and a pair of rollers mounted diametrically opposite each other on the other side of said member and for engaging the other of said followers.

6. In a shutter device for a duplex projection apparatus, the combination with a support, two pairs of arms intermediately pivoted to said support, and two pairs of shutter bars pivoted to opposite ends of respective pairs of said arms to form two parallelogram linkages, and two pairs of shutter blades, each blade being attached to one of said bars, and the blades of a pair being movable away from each other to an open position and into overlapping relation to a closed position, of a pair of followers each being attached to respective pairs of said arms for movement parallel to said shutter bars, a rotatable disk journaled in said support, a pair of rollers mounted diametrically opposite each other on one side of said disk and for engaging one of said followers, and a pair of rollers mounted diametrically opposite each other on the other side of said disk and for engaging the other of said followers, each roller of one pair being displaced 90 degrees from either of the rollers in the other pair.

7. In a shutter assembly, the combination with a support, a pair of arms intermediately pivoted to said support, and a pair of shutter bars each pivoted to opposite ends of said arms to form a parallelogram linkage, and a shutter blade attached to each of said bars and movable into association with each other, of a follower connected to said arms, a rotatable disk, and a roller eccentrically mounted on said disk and for moving said follower and both of said shutter blades toward or away from each other, each with simple harmonic motion.

8. In a shutter assembly, the combination with a support, a pair of arms intermediately pivoted to said support, and a pair of shutter bars each pivoted to opposite ends of said arms to form a parallelogram linkage, a pair of shutter blades each provided with an elongated opening, and fasteners on said shutter bars and passing through said opening for adjusting the position of the shutter blades, with respect to said bars, of a follower connected to said arms, a rotatable disk, and a roller eccentrically mounted on said disk and for moving said follower and both of said shutter blades toward or away from each other each with simple harmonic motion.

9. In a shutter assembly, the combination with a support, a pair of arms intermediately pivoted to said support, and a pair of shutter bars each pivoted to opposite ends of said arms to form a parallelogram linkage, and a shutter blade attached to each of said bars and movable into association with each other, of a follower connected to said arms, a rotatable member carrying a revolving part for moving said follower and both of said shutter blades with simple harmonic displacement, and a spring member diagonally connected across said parallelogram linkage for normally urging said shutter blades to closed position and said follower against said revolving part.

10. In a duplex projection apparatus having a pair of gate stations, the combination with a similar pair of illuminating and optical assemblies, each in alignment with one of said gate stations, and each for projecting a light beam onto the same area, of a pair of shutter assemblies each associated with one of said illuminating and optical assemblies, and each including a pair of shutter blades oppositely movable to an open position and to a closed position, a driving means including a follower member attached to each shutter assembly and including a rotating member carrying a revolving part for engaging and moving said follower, and resilient means connected to said shutter assemblies and for normally urging the shutter blades thereof into closed position and said followers against said revolving part.

RAYMOND W. WENGEL.